(12) United States Patent
Piwonka et al.

(10) Patent No.: US 10,747,287 B2
(45) Date of Patent: Aug. 18, 2020

(54) BACKUP POWER SUPPLY BASED CONFIGURATION DATA APPLICATION

(71) Applicant: Hewlett-Packard Development Company, L.P., Houston, TX (US)

(72) Inventors: Mark A. Piwonka, Houston, TX (US); Michael R. Durham, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 16/156,892

(22) Filed: Oct. 10, 2018

(65) Prior Publication Data
US 2020/0117261 A1 Apr. 16, 2020

(51) Int. Cl.
| | | |
|---|---|---|
| G06F 1/00 | (2006.01) | |
| G06F 9/00 | (2006.01) | |
| G06F 1/30 | (2006.01) | |
| G06F 11/07 | (2006.01) | |
| G06F 9/445 | (2018.01) | |
| G06F 11/20 | (2006.01) | |
| G06F 11/14 | (2006.01) | |
| G06F 1/26 | (2006.01) | |

(52) U.S. Cl.
CPC .............. G06F 1/30 (2013.01); G06F 1/263 (2013.01); G06F 9/44505 (2013.01); G06F 11/079 (2013.01); G06F 11/142 (2013.01); G06F 11/2015 (2013.01)

(58) Field of Classification Search
None
See application file for complete search history.

(56) References Cited

U.S. PATENT DOCUMENTS

| | | |
|---|---|---|
| 5,268,928 A | 12/1993 | Herh et al. |
| 6,243,831 B1 | 6/2001 | Mustafa et al. |
| 2005/0055498 A1 | 3/2005 | Beckert et al. |

OTHER PUBLICATIONS

Renesas, "Addressing Power Issues in Real Time Clock Applications", Mar. 1, 2010, 5 pages.
Atmel, "AVR1321 Using the Atmel AVR XMEGA 32-bit Real Time Counter and Battery Backup System", 2011, 12 pages.
Katie Pier, Texas Instruments, "Using the MSP430™ RTC_B Module With Battery Backup Supply", Feb. 2015, Texas Instruments, 12 pages.
IDT, "Real-Time Clock With Battery Backed Non-Volatile RAM", 2014, 23 pages.
Doug Sams, "Integrating Timekeeper® and real-time clock supervisor functions", May 2015, ST Microelectronics, 18 pages.

*Primary Examiner* — Nitin C Patel
(74) *Attorney, Agent, or Firm* — Mannava & Kang (US LC (57) ABSTRACT

According to examples, an apparatus may include a power circuit to transmit standby power to a device, a memory associated with the device to maintain first configuration data and second configuration data and a battery to provide backup power to the device. The device may, following a loss and a recovery of the standby power to the device, determine whether the backup power was lost during the loss of the standby power. The device may also, based on a determination that the backup power was lost during the loss of the standby power, read the first configuration data or may, based on a determination that the backup power was not lost during the loss of the standby power, read the second configuration data. The device may further apply the read one of the first configuration data or the second configuration data to configure the device.

15 Claims, 6 Drawing Sheets

TABLE 220

| POWER | TYPE | REG | REG_OFF | BIT MASK | SYS[0] | SYS[1] | SYS[2] | ... | SYS[N] |
|---|---|---|---|---|---|---|---|---|---|
| — | SysType | — | — | — | 0x0001 | 0x0002 | 0x0011 | ... | 0x0121 |
| — | BAddr | — | — | — | 0x2E | 0x2E | 0x2E | ... | 0x4E |
| VSB | Config | 0x08 | 0x1C | 0x00 | 0x37 | 0X37 | 0X37 | ... | 0x37 |
| VSB | Config | 0x12 | 0x20 | 0x00 | 0x1A | 0x1B | 0x1B | ... | 0x1B |
| VSB | LD_Reg | 0x01 | 0x60 | 0x08 | 0x0A | 0x0A | 0x0B | ... | 0x0A |
| VDD | LD_Reg | 0x03 | 0x30 | 0x40 | 0x01 | 0x01 | 0x01 | ... | 0x01 |
| VDD | LD_Reg | 0x06 | 0x52 | 0x00 | 0x14 | 0x14 | 0x14 | ... | 0x14 |
| VBAT | LD_Reg | 0x1C | 0x05 | 0xBF | 0x40 | 0x40 | 0x40 | ... | 0x40 |
| ... | ... | | | | | | | | |
| ... | ... | | | | | | | | |

BACKUP POWER SUPPLY BASED CONFIGURATION DATA APPLICATION

BACKGROUND

A computing system may configure various electrical devices when the computing system is initialized. These configurations of the electrical devices may pertain to circuits, coding, and hardware functionality to affect the operations of the computing system.

BRIEF DESCRIPTION OF THE DRAWINGS

Features of the present disclosure are illustrated by way of example and not limited in the following figure(s), in which like numerals indicate like elements, in which.

DETAILED DESCRIPTION

A computing system may configure its internal components upon an initialization of a basic input output system (BIOS). BIOS is a standard defining an interface through which electrical devices in a computing system may be configured. Configuration may pertain to coding, hardware components, and other documentation to affect the computing system function and performance. Electronic devices internal to the computing system may be designed in such a way that they have an appropriate configuration at initialization (e.g., booting up) of the computing system. These devices may default to a particular configuration or the computing system may not boot up. Additionally, if the devices are configured incorrectly, this may cause a contention between the incorrectly configured electrical devices and may cause latency in booting up the computing system and may also cause damage. For example, a pin that includes an electrical connection coming from the electrical device, may be used exclusively for output, thus configuring the pin as input may cause the pin to not function or cause damage to the computing system. Additionally, the space of the electronic device may be limited, thus using an additional dedicated pin to load a different configuration may not be feasible.

According to examples disclosed herein, a device within a computing system may be configured with one of a first configuration data or a second configuration data prior to an initialization of the computing system. The device may be configured with the first configuration data or the second configuration data depending upon whether the device received backup power. That is, the device may be configured with the first configuration data in an instance in which the device did not receive backup power while the device did not receive other power, e.g., standby power. For instance, the device may be configured with the first configuration data in an instance in which the power to the device was completely lost. However, the device may be configured with the second configuration data in an instance in which the device received backup power, e.g., backup power was supplied during the loss of other power to the device.

In one regard, through implementation of the present disclosure, applying standby power to the device may enable the device to obtain various configuration data within a memory depending on a power state of the device prior to application of the standby power. As a result, greater flexibility in the configuration of the device may be afforded through implementation of the present disclosure through the first and second configuration data. That is, for instance, the device may be controlled to be configured differently based on whether backup power is provided or not while the device is not powered by an AC power source.

In any regard, the device may process the one of the first configuration data or the second configuration data depending on the backup power supply state and may configure itself based on the first configuration data or the second configuration data. In addition, the device may be configured prior to the initialization of the computing system. Configuring the device prior to the initialization of the computing system may reduce a latency associated with booting up the computing system as the device may already be configured upon initialization. Additionally, configuring the device prior to the initialization of the computing system, may ensure the device is correctly configured for booting up the computing system.

In another implementation, a register internal to the device may be programmed with a value corresponding to the processed one of the first configuration data or the second configuration data. In this implementation, the register may store the value which relates to a condition of a hardware component. This may provide control and flexibility as the hardware component may be managed by the device through programming of the register with the value. For example, each pin coming from the device may be configured through each register. Programming each register with a different value may enable each pin to perform a different functionality. Further, this may allow the device to change functionalities of each pin. For example, one pin may include an input, another pin may include output, while yet another pin may operate as input and output. The device may change the functionalities of these pins on another configuration.

In a further implementation, the device may include a data table to identify the value based on the first configuration data or the second configuration data. Providing the data table with the value to program the register internal to the device may provide an automatic configuration without user input. Configuring the device prior to initialization of the computing system based on the first configuration data or the second configuration data may enable several variations of configurations across various devices. Additionally, programming a particular register with the value from the data table may enable the device to be used in different computing system platforms, as the device may configure itself from the table rather than from a platform specific interface. Further, this may enable the device for use on multiple platforms, as opposed to each platform using a specific device to that platform. Furthermore, using the table to identify values for configuring the device may remove a dedicated strapping pin which may be used to receive configuration data. This may also save space within the computing system as reducing a number of pins coming from the device.

In summary, implementations disclosed herein may reduce latency associated with initializing a computing system while also providing additional flexibility in the configuring of a device of the computing system. Additionally, the implementations disclosed herein may enable the device for multiple configurations among various computing systems.

Before continuing, it is noted that as used herein, the terms "includes" and "including" mean, but is not limited to, "includes" or "including" and "includes at least" or "including at least." The term "based on" means "based on" and "based at least in part on."

Figure 1:
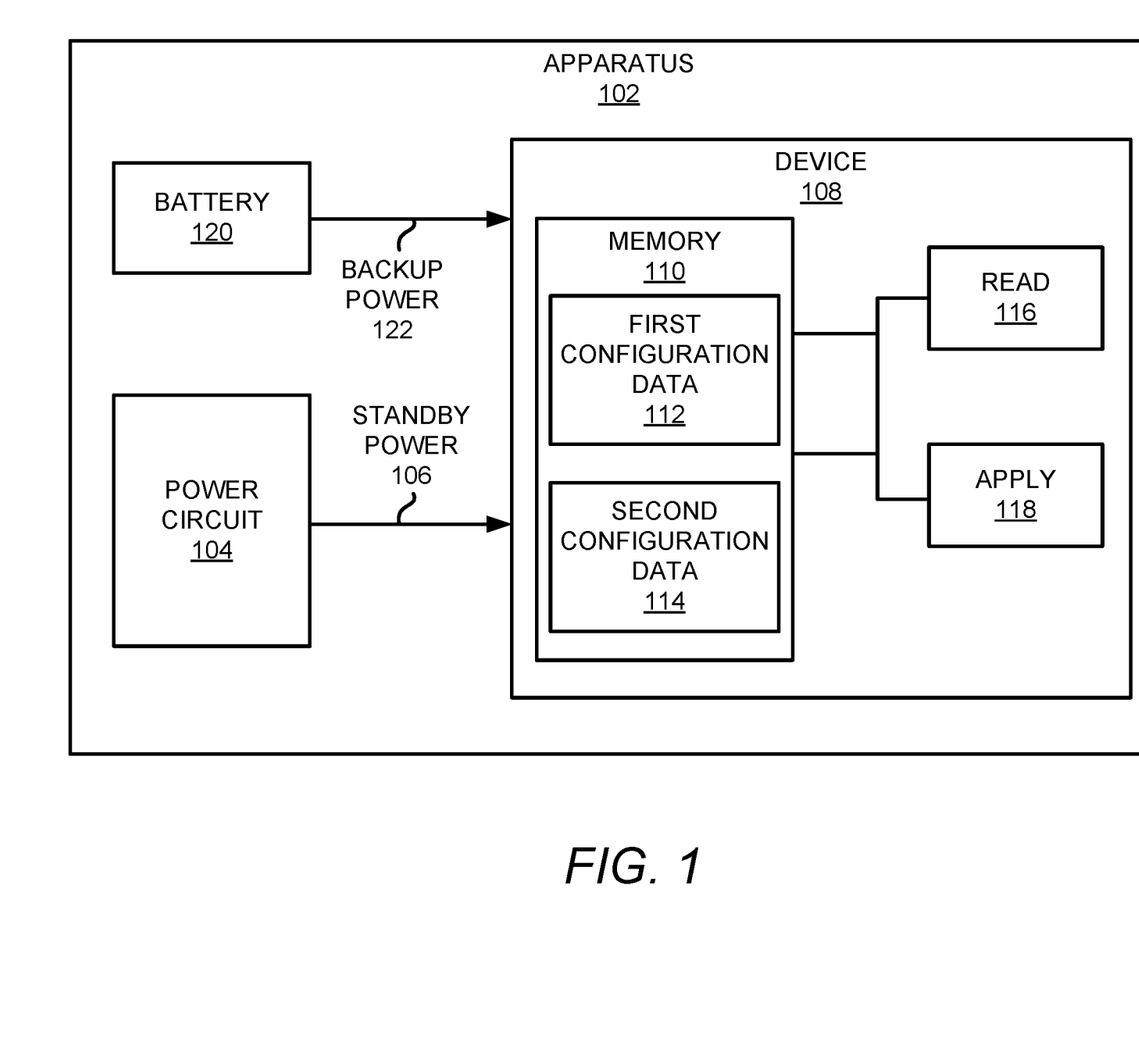
FIG. 1 shows a block diagram of an example apparatus that may apply one of a first configuration data or a second configuration data to configure a device.

With reference first to FIG. 1, there is shown a block diagram of an example apparatus 102 that may apply one of a first configuration data 112 or a second configuration data 114 to configure a device 108. It should be understood that the apparatus 102 depicted in FIG. 1 may include additional components and that some of the components described herein may be removed and/or modified without departing from the scope of the apparatus 102 disclosed herein.

As shown, the apparatus 102 may include a power circuit 104 that may deliver standby power 106 to a device 108. The apparatus 102 may also include a battery 120 that, when sufficiently charged and connected to the device 108, may deliver backup power 122 to the device 108, e.g., when the standby power 106 is lost or otherwise ceases to be supplied to the device 108. The apparatus 102 may be a computing system or other computing apparatus that may be programmed to carry out a finite set of operations and as such may include a central processing unit (CPU) in addition to the device 108, the power circuit 104, and the battery 120. Implementations of the apparatus 102 may include a mobile device, a client device, personal computer, desktop computer, laptop, tablet, notebook, video game console, retail point of sale device, scientific instrument, or other type of electronic device that may execute various applications and carry out operations. For example, the apparatus 102 may also include a motherboard and a central processing unit (CPU).

The power circuit 104 may be a type of power processing circuit internal to the apparatus 102, which may apply the standby power 106 to the device 108. As such, the power circuit 104 may connect to an external power source (not illustrated), such as an alternating current (AC) power source to apply the standby power 106 to the device 108. The power circuit 104 may receive power from the external source and filter, convert, and/or condition the received power to obtain the standby power 106. Implementations of the power circuit 104 may include a power management circuit, converter, rectifier, power storage, power factor correcting circuit, circuit logic, amplifier, or other type of power circuit 104 that may receive an input power to obtain the standby power 106 for delivery to the device 108.

In some implementations, the power circuit 104 may also deliver main power in addition to the standby power 106 to the device 108. In another implementation, the power circuit 104 may be connected to the AC power source and may include a low power rail to transmit the standby power 106 and a high power rail to transmit the main power to the device 108. In this implementation, the apparatus 102 may turn on (i.e., boot up) thus receiving a higher magnitude of power (e.g., the main power) on the high power rail. The main power may initialize the apparatus 102 for booting up. The initialization of the apparatus 102 may include the boot up or power on of the apparatus 102 and as such, may include powering on the CPU and operating system for configuring the overall apparatus 102.

The battery 120 may be any type of battery that may provide backup power 122 to the device 108. That is, the battery 120 may provide the backup power 122 when standby power 106 or main power (discussed in greater detail herein) to the device 108 is lost. The standby power 106 and the main power to the device 108 may be lost when the AC power to the power circuit 104 is cut off and/or when the power circuit 104 experiences a fault or a failure. In addition, the backup power 122 may be lost when, for instance, the battery 120 runs out of power, e.g., is drained, or if the battery 120 is removed. The device 108 may thus be in one of a plurality of different power states. For instance, the device 108 may be in one of a first power state during which the device 108 receives standby power 106, a second power state during which the device 108 receives main power, a third power state during which the device 108 receives backup power 122, and a fourth power state during which the device 108 receives no power.

According to examples, the battery 120 may provide the backup power 122 to certain components in the device 108. For instance, the battery 120 may provide the backup power 122 to some of the registers in the device 108. In addition, different configuration data may be applied to the battery-backed registers depending upon the power state from which the device 108 recovers. That is, for instance, the device 108 may include a memory 110 on which is stored first configuration data 112 and second configuration data 114. In addition, the first configuration data 112 may be read 116 and applied 118 in the event that the device 108 recovered from a power state in which both the standby power 106 and the backup power 122 were lost. Moreover, the second configuration data 114 may be read 116 and applied 118 in the event that the backup power 122 was not lost during a loss of the standby power 106. In one regard, the values applied by the battery-backed registers on hardware components to which those registers are associated may vary depending upon whether or not the backup power 122 was supplied to the device 108 while the standby power 106 was lost. The first configuration data 112 and the second configuration data 114 are described in greater detail herein.

The device 108 may be an integrated circuit that may manage at least one hardware component and/or at least one particular use within the apparatus 102 and as such, may include a controller, such as an I/O controller, for use in the apparatus 102. The device 108 may be used in addition to the CPU on the motherboard (not illustrated) of the apparatus 102. In this implementation, the CPU may manage the overall operation of the apparatus 102 while the device 108 may mange at least one hardware component and/or manage one particular use of the apparatus 102. In this regard, the device 108 may operate as an auxiliary processor while the CPU operates as the main processing unit. FIG. 1 illustrates the device 108 as including the memory 110, the first configuration data 112, the second configuration data 114, a read instruction 116, and an apply instruction 118 for illustration purposes and not for purposes of limitation. Thus, for instance, the memory 110 may store configuration data in addition to the first and second configuration data 112, 114, respectively.

In another implementation, the device 108 may include a firmware-based device with machine-readable instructions executable by the device 108. In this implementation, the device 108 may include a firmware-based device, such as a super I/O, application-specific integrated circuit (ASIC) which may be customized for a specific purpose or particular use, rather than for general functioning of the apparatus 102. The device 108 may operate with firmware (i.e., machine-readable instructions) stored in the memory 110 in addition to the first configuration data 112 and the second configuration data 114. When the apparatus 102 is connected to the external power source (but not yet turned on), the standby power 106 is applied so the device 108 may read the second configuration data 114 from the memory 110. The device 108 may use the second configuration data 114 to configure its pins, and program desired registers for initializations. Once the apparatus 102 is turned on and receives the main power, the device 108 may already be configured and operating without a basic input/output interface or other type of interface to configure upon initializing the apparatus 102.

The device 108 may also include a programmable register and/or port, etc. The programmable registers may be written with values by the device 108 which correspond to the first configuration data 112 and/or the second configuration data 114. The values written to the programmable registers may indicate a functionality of the hardware component that corresponds to that programmable register. Implementations of the device 108 may include the super I/O, integrated circuit, ASIC, auxiliary processor, auxiliary controller, embedded system, chipset, microchip, semiconductor, or other type of electronic component that may receive the standby power 106 for configuration.

The memory 110 may be a storage area internal to the device 108, which maintains the first configuration data 112 and the second configuration data 114. In some implementations, the standby power 106 may energize the memory 110 for the device 108 to retrieve the first configuration data 112 and/or the second configuration data 114. In other implementations, the memory 110 may include a non-volatile memory to maintain the first configuration data 112 and the second configuration data 114. In further implementations, the memory 110 may include a data table with values corresponding to the first configuration data 112 and the second configuration data 114 for the device 108 to program a register. Implementations of the memory 110 may include a non-volatile memory, volatile memory, flash memory, local storage, storage area, memory buffer, cache, random access memory (RAM), dynamic RAM, Electrically Erasable Programmable Read-Only memory (EEPROM), read-only memory (ROM), storage drive, or other storage area that may maintain the first configuration data 112 and the second configuration data 114.

The first configuration data 112 and the second configuration data 114 may each be a series of variables stored by the memory 110 for configuring the device 108. In this manner, the first configuration data 112 and the second configuration data 114 may instruct the device 108 as to how to configure itself. In one implementation, the first configuration data 112 and the second configuration data 114 may include strapping data to define a location of the device 108 on a motherboard within the apparatus 102. In this implementation, the apparatus 102 may include multiple devices on multiple motherboards, thus the strapping data may identify the location of which device on which motherboard, etc.

Additionally, the strapping data may be used to identify a particular configuration among multiple configurations for a particular device with a particular motherboard, etc. Including the strapping data as the first configuration data 112 and/or the second configuration data 114 may decrease a number of pins on the device 108 and may reduce the overall space of the device 108 as a dedicated strapping pin to drive each type of configuration for the device 108 is removed. In another implementation, the first configuration data 112 and/or the second configuration data 114 may include an identification of a particular register within the device 108. As such, the identification of the particular register may be used to determine the value in which to program that register. This implementation is described in detail in a later figure.

The instructions 116 may be executed to cause the device 108 to read, e.g., process the first configuration data 112 or the second configuration data 114 retrieved from the memory 110. Applying the standby power 106 to the device 108 may signal the device 108 to obtain the first configuration data 112 or the second configuration data 114 for reading 116. According to examples and as discussed herein, the device 108 may be signaled to obtain the first configuration data 112 in instances in which the backup power 122 was lost during the loss of the standby power 106. In addition, the device 108 may be signaled to obtain the second configuration data 114 in instances in which the backup power 122 was not lost during the loss of the standby power 106, i.e., the backup power 122 was applied as intended. In some implementations of the read process 116, the device 108 may utilize a data table or data structure to identify a value corresponding to the configuration data. Using the value from the data table, the device 108 may program a register to configure a hardware component that corresponds to the register. This implementation is discussed in detail in later figures. Implementations of the read process 116 may include a set of instructions, process, operation, logic, algorithm, technique, logical function, firmware, and/or software executable by the device 108 to process the first configuration data 112 or the second configuration data 114.

The instructions 118 may be executed to cause the device 108 to be configured based on the first configuration data 112 or the second configuration data 114 within the memory 110. That is, the instructions 118 may cause the read one of the first configuration data 112 or the second configuration data 114 to be applied to the device 108. In some implementations of the instructions 118, the device 108 may write values to desired registers (not illustrated) to configure the device 108 within the apparatus 102. Writing values to the desired registers within the device 108 may enable the configuration of hardware components that correspond to the desired registers. The device 108 may be configured via the apply instructions 118 prior to the initialization of the apparatus 102. The initialization of the apparatus 102 may include booting up the CPU and/or the apparatus 102. Implementations of the apply instructions 118 may include a set of instructions, process, operation, logic, algorithm, technique, logical function, firmware, and/or software executable by the device 108 for configuring the device 108 based on the first configuration data 112 or the second configuration data 114.

Figure 2A:
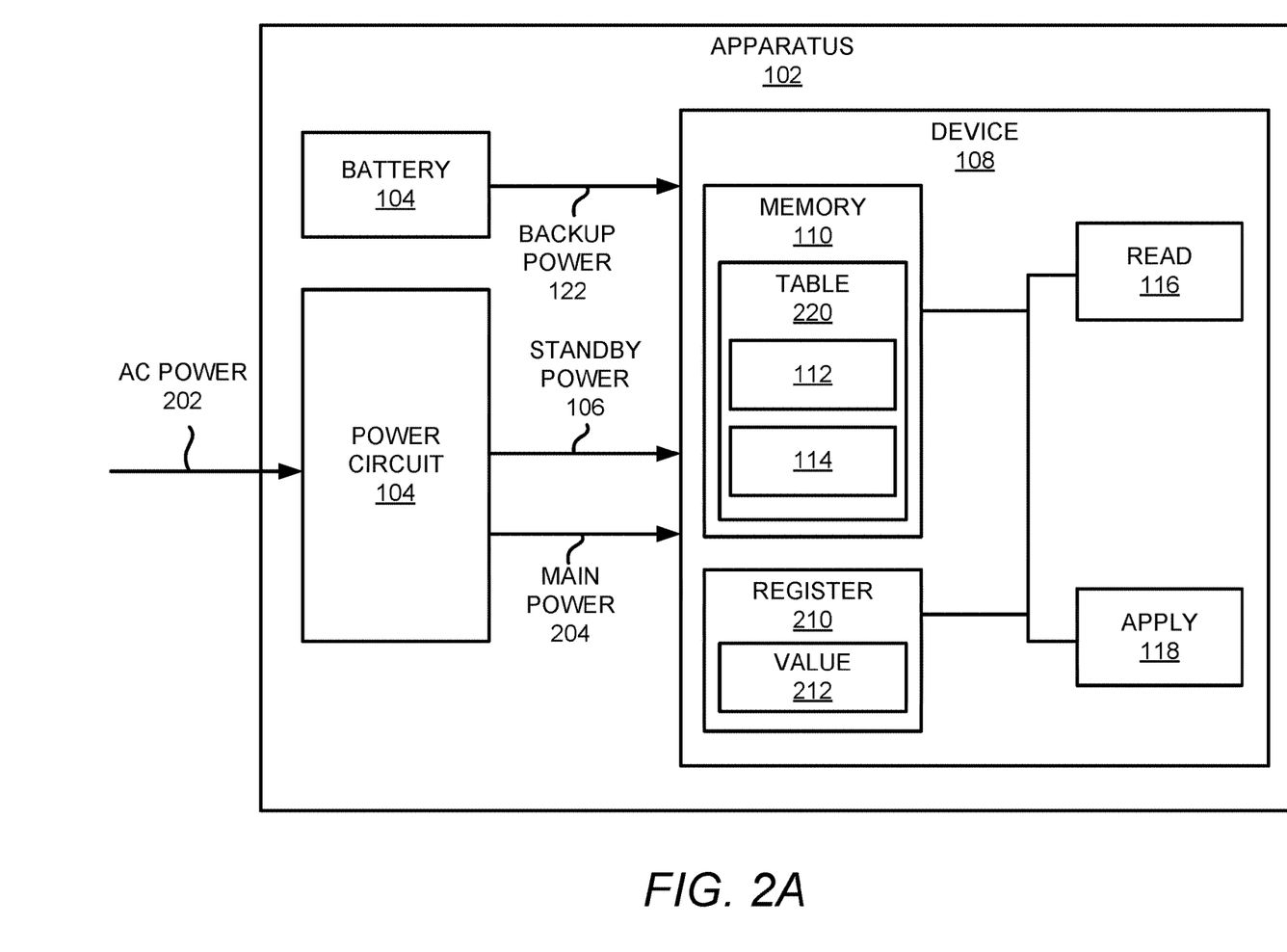
FIG. 2A shows a block diagram of an example apparatus to receive input power and delivery standby power to configure a device prior to delivery of a main power for initialization of the apparatus.

With reference now to FIG. 2A, there is shown a block diagram of an example apparatus 102 to receive input power and deliver standby power 106 to configure a device 108 prior to delivery of a main power 204 for initialization of the apparatus 102. It should be understood that the apparatus 102 depicted in FIG. 1 may include additional components and that some of the components described herein may be removed and/or modified without departing from the scope of the apparatus 102 disclosed herein.

The device 108 may load configuration data, e.g., one of the first configuration data 112, the second configuration data 114, or other configuration data, when the apparatus 102 is connected to an external power source (not shown). During the connection of the apparatus 102 to the external power source, the power circuit 104 may receive an alternating current (AC) power 202 and supply the standby power 106 to the device 108. This may enable the device 108 to load a custom configuration prior to the apparatus 102 turning on or booting up. That is, for instance, when the apparatus 102 entered a state in which the apparatus 102 received no power prior to the device 108 receiving the standby power 106, the first configuration data 112 may be read and applied. However, when the apparatus 102 received backup power 122, e.g., when the AC power 202 to the apparatus 102 was lost, the second configuration data 114 may be read and applied.

Although throughout this application, examples of configuring hardware components such as pins and registers are illustrated and/or described, implementations should not be so limited. For example, the first configuration data 112 and the second configuration data 114 may contain program code for the device 108 operation such as: pin configuration; fan control; thermal protection; function enable/disable; internal/external device addresses; communication protocols; bus speed; communication bus width; debugging information, computing system capability data; programmable register values; and signal asserting timing.

The AC power 202 may be an electrical charge provided to the power circuit 104 upon the apparatus 102 connecting to the external power source. The power circuit 104 may control the amount of power delivered to the device 108. In one implementation, the AC power 202 may be delivered continuously to the power circuit 104 while the apparatus 102 is plugged into (i.e., connected) to the external power source. In this implementation, the power circuit 104 may provide the standby power 106 even though the apparatus 102 may not yet be initialized or tuned on.

The main power 204 may be applied to the apparatus 102 and the device 108 to initialize the overall functioning of the apparatus 102. In one implementation, the main power 204 may be provided to a central processing unit (CPU) to initialize an operating system for the overall functioning of the apparatus 102. In this implementation, a user may boot up the apparatus 102 by initiating a power state of the power circuit 104 to deliver the main power 204. Implementations of the main power 204 may include current, voltage, and/or other electrical charge that may initialize the apparatus 102.

As shown, the device 108 may include a register 210 that may store a bit of information (i.e., value) in such a way that the device 108 may read or write out the bit of information. The register 210 may be a battery-backed register and may receive backup power 122 from the battery 120 when the register 210 does not receive the standby power 106 or the main power 204. The bit of information may represent a condition of a hardware component internal to the apparatus 102. In this implementation, the device 108 may manage at least one of the hardware components (not illustrated) internal to the apparatus 102. In this regard, the register 210 may be a placeholder for information about the hardware component functionality.

The value 212 may indicate a functionality of a hardware component associated with the register 210. In another implementation, the register 210 may configure a thermal circuit through the first configuration data 112 or the second configuration data 114. In this implementation, the thermal circuit may be configured prior to the initialization of the apparatus 102. Configuring the thermal circuit, which may include a thermal sensor and/or a cooling fan, prior to initializing the apparatus 102 may prevent damage or other types of thermal issues prior to the boot up of the apparatus 102.

Figure 2B:
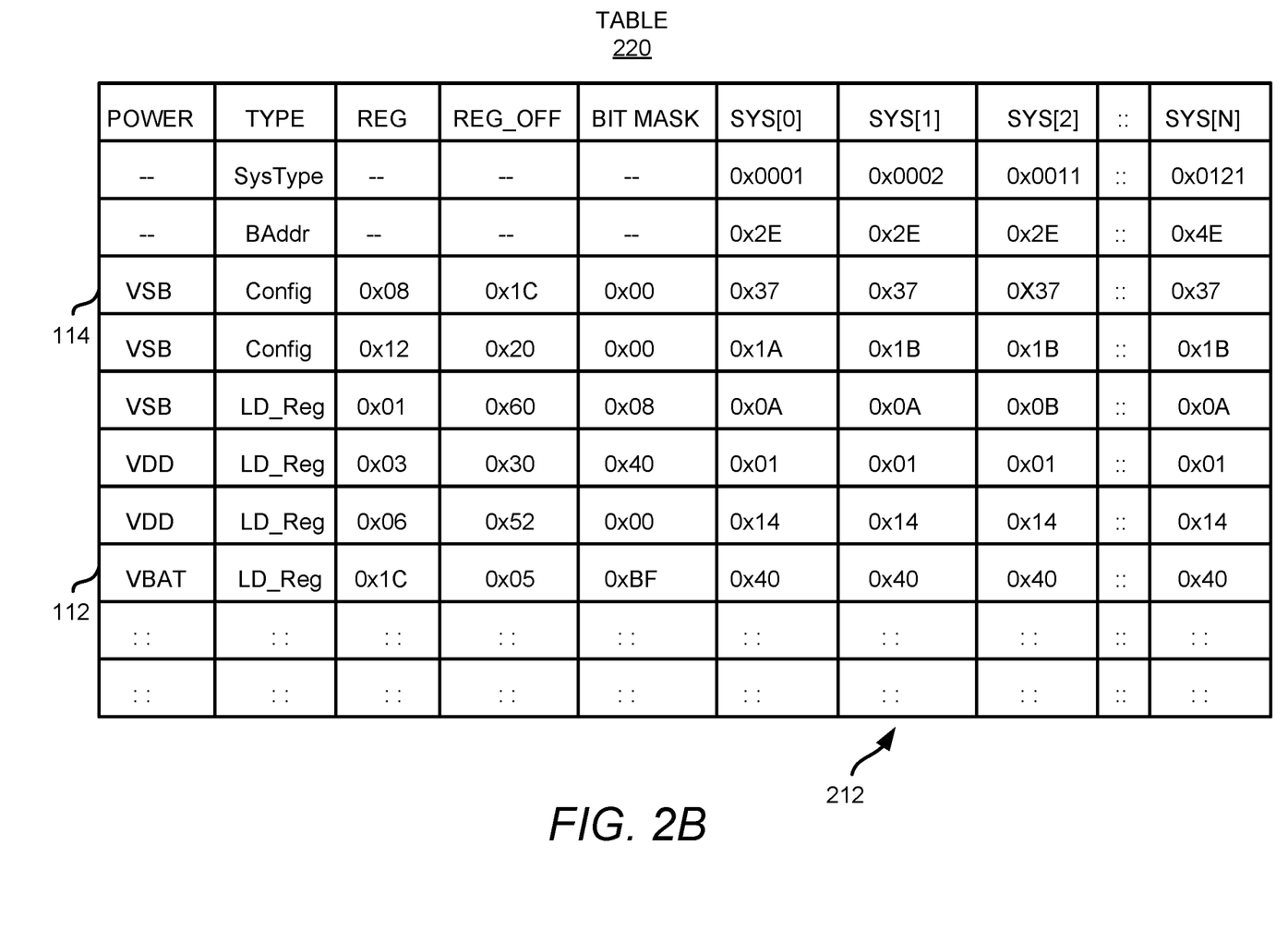
FIG. 2B shows a diagram of an example table including first configuration data and second configuration data to identify a corresponding value for a register.

The value 212 may be the bit of information programmed into the register 210 by the device 108. Using the first configuration data 112 or the second configuration data 114, the value 212 may be identified using a data table 220 or data structure as shown in FIG. 2B. Identifying the value 212 from a data table 220 may enable the device 108 to program and/or write the value 212 to the register 210. Each value in FIG. 2B may represent a various functionality among the hardware components.

FIG. 2B is a diagram of an example table 220 including first configuration data 112 and second configuration data 114 to identify a corresponding value 212 for a register 210. As shown, the table 220 may include a POWER field that includes a first power condition (VSB), which may indicate an exit from a first power state during which the standby power 106 and the main power 204 were lost, but the backup power 122 was supplied to the register 210. The table 220 may also include a second power condition (VDD), which may indicate an exit from a second power state during which standby power 106 was applied to the register 210. The second power state may be a state in which the register 210 received standby power 106. The table 220 may further include a third power condition (VBAT), which may indicate an exit from the first power state, in which the standby power 106, the main power 204, and the backup power 122 to the register 210 were lost.

As also shown, the table 220 may include a TYPE field that may define what type of access is requested by the specific table 220 entry. The "Config" access type may allow writes to all "standard configuration registers." The "LD_Reg" access type may allow writes to Super I/O registers based off the LD Base Address. The "BAddr" access type may select the Super I/O base address.

The table 220 may also include various values 212 for various systems [0]-[N], in which the variable "N" may represent an integer greater than one. Thus, for instance, the table 220 may be applied to identify values 212 for multiple hardware components. That is, the specific entries may be applied to the specific hardware components. For example, the registers may include multiple registers, the corresponding values may include binary values, the hardware functions may include additional functions such as enable/disable, input/output, and the hardware components may include additional components such as fan control, etc. In another implementation, the configuration data may include strapping data which identifies a configuration among various configurations of the device. The strapping data may be used to identify a particular configuration for the device among multiple configurations. In this implementation, there may be multiple devices internal to the computing system, thus each device may include a different configuration. Additionally, this implementation enables the device for use among various platforms among various computing systems.

According to examples, following the standby power 106 being lost, e.g., due to the AC power 202 being disconnected from the AC power source, the AC power source going dark, etc., the AC power 202 may be supplied to the power circuit 104. The power circuit 104 may supply the standby power 106 to the device 108. Applying the standby power 106 to the device 108 may cause the device 108 to obtain one of the first configuration data 112 or the second configuration data 114 from the memory 110. Prior to obtaining the one of the first configuration data 112 or the second configuration data 114, the device 108 may determine whether the backup power 122 was lost while the standby power 106 was lost. By way of example, the device 108 may make that determination based on whether a predefined bit of a register is set to a one or a zero. For instance, while power is supplied to the register 210, the predefined bit may be set to one and whenever power is completely lost to that register 210, the predefined bit may default to zero. In this example, the device 108 may determine that the backup power 122 was lost in instances in which the predefined bit is set to zero.

Based on a determination that the backup power 122 was lost during the loss of the standby power 106, the device 108 may read the first configuration data 112. That is, for instance, the device 108 may read the power condition (VBAT) entry for a particular hardware component, e.g., may read the value 212 corresponding to the VBAT entry for the particular hardware component. However, based on a determination that the backup power 122 was not lost during the loss of the standby power 106, the device 108 may read the second configuration data 114. That is, for instance, the device 108 may read the power condition (VSB) entry or a particular hardware component, e.g., may read the value 212 corresponding to the VSB entry for that particular hardware component. In addition, the device 108 may apply the read one of the first configuration data 112 or the second configuration data 114 to configure the device 108.

The device 108 may apply (or process) the first configuration data 112 or the second configuration data 114 to identify the corresponding value, function, and/or hardware. The device 108 may use the corresponding value, function, and/or hardware to program the register 210 for hardware functionality. The device 108 may program the register 210 for the configuration prior to an initialization of the apparatus 102. In any regard, it should be understood that the values 212 depicted in the Table 220 are for purposes of illustration and thus, the values 212 should not be construed as limiting aspects of the present disclosure.

Figure 3:
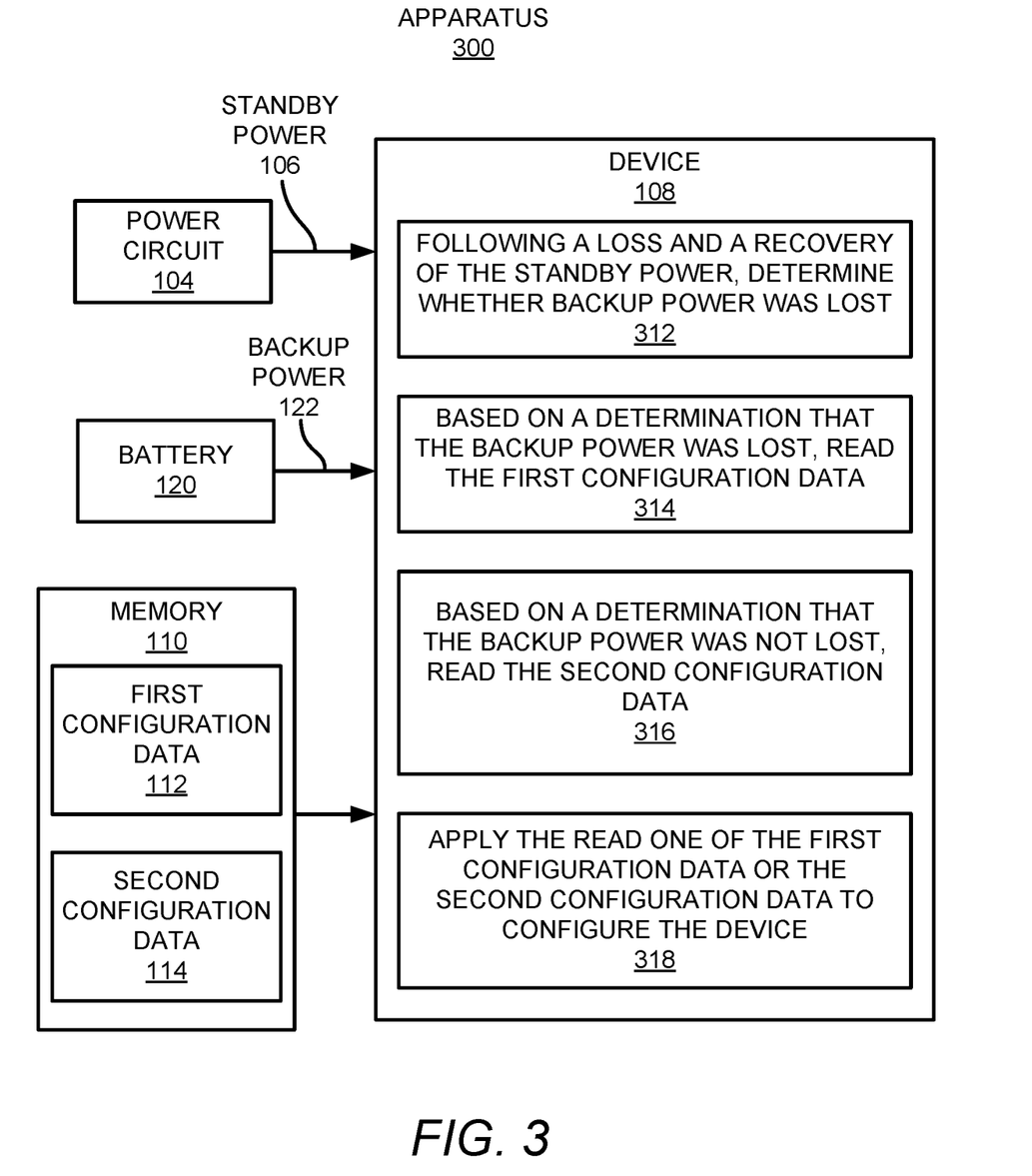
FIG. 3 shows a block diagram of an example apparatus that may apply one of a first configuration data or a second configuration data to configure a device.

Reference is now made to FIGS. 1-3. FIG. 3 depicts a block diagram of an example apparatus 300 that may apply one of a first configuration data 112 or a second configuration data 114 to configure a device 108. It should be understood that the apparatus 300 depicted in FIG. 3 may include additional components and that some of the components described herein may be removed and/or modified without departing from the scope of the apparatus 300 disclosed herein. The apparatus 300 may be similar to the apparatus 102 and may thus include the same or similar elements as those depicted in FIGS. 1 and 2A.

As shown in FIG. 3, the device 108 may implement or execute a set of instructions 312-318. Although not shown in FIG. 3, the apparatus 300 may include a processor that may control operations of the apparatus 300, including executing the instructions 312-318. The processor may be a semiconductor-based microprocessor, a central processing unit (CPU), an application specific integrated circuit (ASIC), a field-programmable gate array (FPGA), a graphics processing unit (GPU), a tensor processing unit (TPU), and/or other hardware device. In other examples, the device 108 may include other hardware to execute the instructions 312-318.

The instructions 312-318 (which may also be termed machine readable or computer readable instructions) may be stored in a non-transitory computer readable medium. The non-transitory computer readable medium may be an electronic, magnetic, optical, or other physical storage device that contains or stores executable instructions. The non-transitory computer readable medium may be, for example, Random Access Memory (RAM), an Electrically Erasable Programmable Read-Only Memory (EEPROM), a storage device, an optical disc, and the like. The term "non-transitory" does not encompass transitory propagating signals.

The instructions 312 may be executed to, following a loss and a recovery of the standby power 106 to the device 108, determine whether the backup power 122 was lost during the loss of the standby power 106. That is, the instructions 312 may be executed to determine whether the backup power 122 did not supply the backup power 122 when the AC power 202 to the power circuit 104 was lost. According to examples, the determination as to whether the backup power 122 was lost during the loss of the standby power 106 may be based on whether a predefined bit is set to a one or a zero as discussed herein. Thus, for instance, following recovery of the standby power 106, the device 108 may access the predefined bit to determine the setting of the predefined bit and may read the first configuration data 112 or the second configuration data 114 based on the setting of the predefined bit.

The instructions 314 may be executed to, based on a determination that the backup power 122 was lost during the loss of the standby power 106, read the first configuration data 112. The instructions 316 may be executed to, based on a determination that the backup power 122 was not lost during the loss of the standby power 106, read the second configuration data 114. As discussed herein with respect to FIGS. 2A and 2B, the first configuration data 112 and the second configuration data 114 may be maintained as entries in a table 220.

The instructions 318 may be executed to apply the read one of the first configuration data 112 or the second configuration data 114 to configure the device 108. As the first configuration data 112 and the second configuration data 114 may configure the device 108 differently with respect to each other, the device 108 may be configured differently based on whether or backup power 122 was lost or not during loss of the standby power 106.

Figure 4:
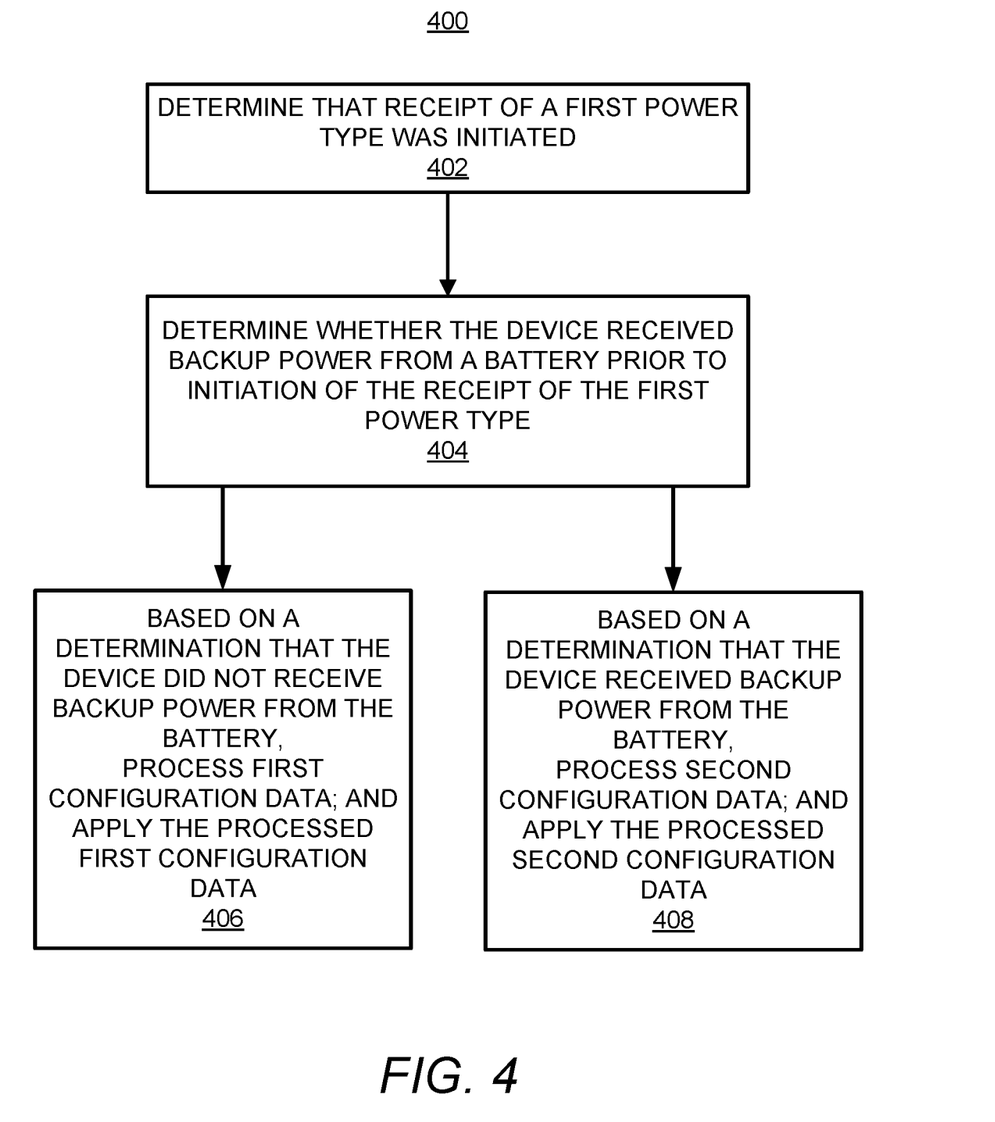
FIG. 4 shows a flow diagram of an example method for applying a first configuration data for a device based on whether the device received backup power from a battery.

Various manners in which the apparatuses 102, 300 may be implemented are discussed in greater detail with respect to the method 400 depicted in FIG. 4. Particularly, FIG. 4 depicts an example method 400 for applying a first configuration data 112 for a device 108 based on whether the device 108 received backup power 122 from a battery 120. It should be apparent to those of ordinary skill in the art that the method 400 may represent a generalized illustration and that other operations may be added, or existing operations may be removed, modified, or rearranged without departing from a scope of the method 400.

The description of the method 400 is made with reference to the apparatuses 102, 300 and the table 220 illustrated in FIGS. 1-3 for purposes of illustration. It should be understood that apparatuses and tables having other configurations may be implemented to perform the method 400 without departing from a scope of the method 400. In addition, the method 400 may be implemented prior to initialization of an apparatus 102, 300.

The device 108 may execute or implement the method 400, in which the device 108 may be a firmware-based device, which may include memory and program code stored in the memory, such as an embedded system. The firmware contained in the device 108 may be machine-readable instructions that may provide the control program for the device 108 and as such may be stored and/or maintained in a non-volatile memory associated with the device 108. The first configuration data 112 and the second configuration data 114 may include information that may instruct the configuration of the device 108. As discussed herein, the first configuration data 112 and the second configuration data 114 may reside in the memory 110 associated with the device 108, such that, when standby power 106 is applied to the device 108, the first configuration data 112 or the second configuration data 114 may be obtained.

In one implementation, each of the first configuration data 112 and the second configuration data 114 may include identifying data which may correspond to a value 212 within a data structure, e.g., table 220. In this implementation, the device 108 may obtain the value 212 from the data structure using the first configuration data 112 or the second configuration data 114 and program the value 212 into a register 210 associated with the device 108. The register 210 may include information which may be programmed in such a way that it instructs the device 108 how to use a hardware component associated with the register 210. For example, the register 210 may be associated with pins on the device 108 and as such, the value 212 programmed into the register 210 may include input, output, etc. Implementations of the register 210 may include an electronic register, hardware register, and/or processor register. In another implementation, the first configuration data 112 and the second configuration data 114 may include strapping data that identifies the type of configuration for use with the device 108.

In a further implementation, the first configuration data 112 and the second configuration data 114 may include a functionality of how the device 108 is to operate. Configuring the device 108 prior to the initialization of the apparatus 102, 300 may enable the device 108 to load the first configuration data 112 or the second configuration data 114 for booting up the apparatus 102, 300. This may enable the device 108 to load a custom configuration prior to the apparatus 102, 300 and power on. Additionally, this may decrease latency in booting up the apparatus 102, 300.

Further, although FIG. 4 is described as implemented by a device 108 as in FIGS. 1, 2A, and 3, the method 400 may be executed on other suitable components. For example, the method 400 may be implemented in the form of executable instructions on a machine-readable storage medium, such as a machine-readable storage medium. In another example, the method 400 may be implemented by a processor associated with the apparatus 102, 300 to manage functionality and configuration of the device 108.

At block 402, the device 108 may determine that receipt of a first power type by the device 108 was initiated. That is, the device 108 may determine that the device 108 has transitioned from a first power state to a second power state, in which the first power state is a power state in which the device 108 did not receive standby power 106. In this regard, the device 108 may determine that receipt of the standby power 106 was initiated following, for instance, a power off state.

At block 404, the device 108 may determine whether the device 108 received backup power 122 from a battery 120 prior to initiation of the receipt of the first power type. That is, the device 108 may determine whether the device 108 received backup power 122 from the battery 120 while the standby power 106 was lost. The device 108 may make this determination based on the setting of a predefined bit corresponding to the backup power 122 as discussed herein.

At block 406, based on a determination that the device 108 did not receive backup power 122 from the battery 120 prior to initiation of the receipt of the first power type, the device 108 may process 116 first configuration data 112 for the device 108. In addition, the device 108 may apply 118 the processed first configuration data 112 to configure the device 108.

However, at block 408, based on a determination that the device 108 received backup power 122 from the battery 120 prior to initiation of the receipt of the first power type, the device 108 may process 116 second configuration data 114 for the device 108. In addition, the device 108 may apply 118 the second configuration data 114 to configure the device 108.

Through implementation of the method 400, the device 108 may process the first configuration data 112 or the second configuration data 114 obtained from the memory 110 associated with the device 108 when standby power 106 is applied. At this operation, the device 108 may be plugged into an alternating current (AC) source, but main power 204 may not be applied yet. In this implementation, the apparatus 102, 300 may be plugged into a wall outlet and receive AC current which in turn may be applied to the device 108 within the apparatus 102, 300. The main power 204 may be received by the apparatus 102, 300 when turned on. In this implementation, the standby power 106 may be a lower magnitude of current than the main power 204 applied to the apparatus 102, 300. In this manner, the device 108 may be configured from standby power 106 prior to initializing the apparatus 102, 300 with the main power 204.

The standby power 106 may be a type of auxiliary power from which the device 108 may read the first configuration data 112 or the second configuration data 114 from a memory of the device 108. The first configuration data 112 or the second configuration data 114 may be used to configure the hardware internal to the apparatus 102, 300 and by programming the desired registers for initialization. Thus, when the main power 204 is applied and the apparatus 102, 300 is initialized, the device 108 may already be configured and operating properly without a basic input output system (BIOS) or other type of configuration interface.

In other examples, the device 108 may use the first configuration data 112 or the second configuration data 114 to program a register 210 internal to the device 108. The register 210 may configure a hardware component within the apparatus 102, 300 that is associated with the device 108. For example, the register 210 may include functioning of fans, thermal monitoring, pin configuration, thermal protection, etc. In these examples, the value 212 programmed into the register 210 may correspond to the functioning of the hardware component. For example, the hardware component may include the pin configuration on the device 108, thus the value 212 programmed into the register 210 may indicate whether a particular pin may function as input, output, serial port, parallel port, etc.

In addition or in other examples, the device 108 may process the first configuration data 112 or the second configuration data 114 in accordance with a data table 220. The first configuration data 112 or the second configuration data 114 may identify the particular register in which to program, thus the device 108 may use the table 220 to determine the value 212 corresponding to the particular register 210 in which to program that register 210. The value 212 programmed into the register 210 may define the functionality of the hardware component associated with the device.

The device may be configured based on the processed first configuration data 112 or the processed second configuration data 114. The device 108 may be configured prior to applying the main power 204 to the apparatus 102, 300 for initialization. In this implementation, the device 108 may be configured prior to the apparatus 102, 300 booting up. In another implementation, the thermal system of the apparatus 102, 300 may be configured through registers internal to the device 108 prior to applying the main power 204 to the apparatus 102, 300 for initialization. This may reduce the reaction time of configuring the thermal system when experiencing issues from initialization. In a further implementation, upon execution of the method 400, main power 204 may be applied to the apparatus 102, 300 for initialization.

Some or all of the operations set forth in the method 400 may be contained as utilities, programs, or subprograms, in any desired computer accessible medium. In addition, some or all of the operations set forth in the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
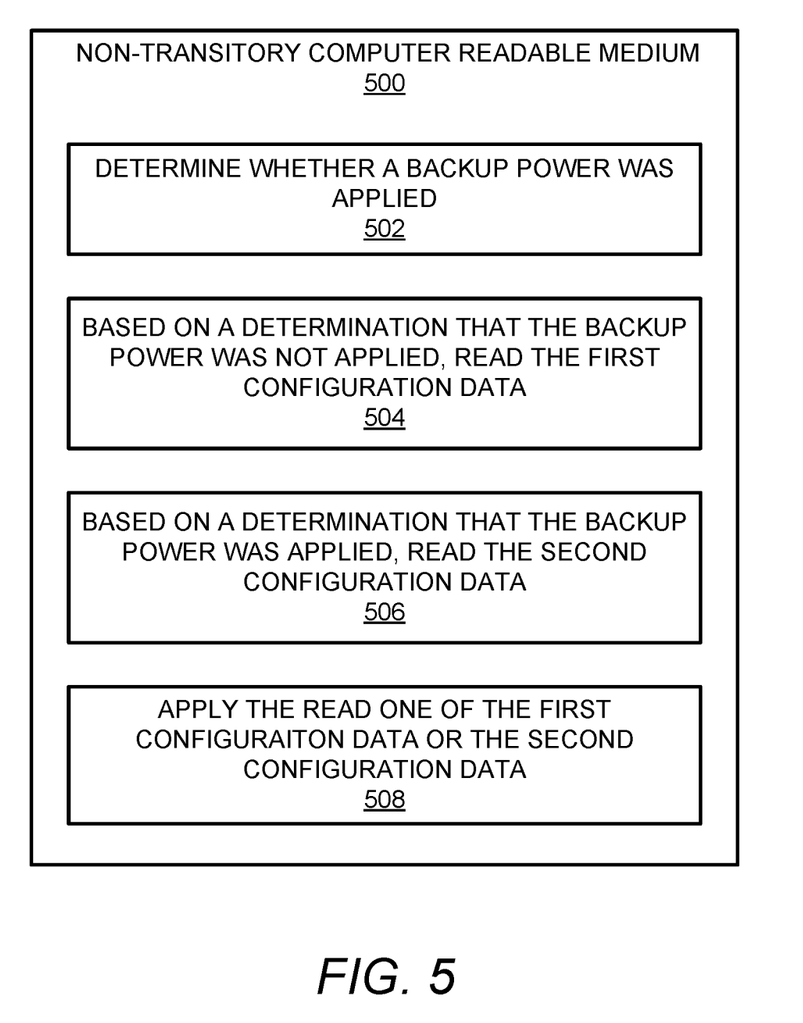
FIG. 5 depicts a block diagram of an example non-transitory computer readable medium.

Turning now to FIG. 5, there is shown a block diagram of an example non-transitory computer readable medium 500 that may have stored thereon machine readable instructions that when executed by a processor, may cause the processor to apply one of a first configuration data 112 or a second configuration data 114 based on whether a backup power was lost during a loss of a standby power 106. It should be understood that the non-transitory computer readable medium 500 depicted in FIG. 5 may include additional instructions and that some of the instructions described herein may be removed and/or modified without departing from the scope of the non-transitory computer readable medium 500 disclosed herein.

The non-transitory computer readable medium 500 may have stored thereon machine readable instructions 502-508 that a processor may execute. The non-transitory computer readable medium 500 may be an electronic, magnetic, optical, or other physical storage device that contains or stores executable instructions. The non-transitory computer readable medium 500 may be, for example, Random Access memory (RAM), an Electrically Erasable Programmable Read-Only Memory (EEPROM), a storage device, an optical disc, and the like. The term "non-transitory" does not encompass transitory propagating signals.

The processor may fetch, decode, and execute the instructions 502 to determine whether a backup power 122 was applied to a device 108. The backup power 122 may be applied to the device 108 in an instance in which the standby power 106 is lost. The processor may make this determination based on whether a predefined bit is set to one or zero. The processor may fetch, decode, and execute the instructions 504 to, based on a determination that the backup power 122 was not applied to the device 108, read the first configuration data 112. However, the processor may fetch, decode, and execute the instructions 506 to, based on a determination that the backup power 122 was applied to the device 108, read the second configuration data 114. In addition, the processor may fetch, decode, and execute the instructions 508 to apply the read one of the first configuration data 112 or the second configuration data 114 to configure the device 108.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a power circuit to transmit standby power to a device;
   a memory associated with the device to maintain first configuration data and second configuration data, the second configuration data differing from the first configuration data;
   a battery to provide backup power to the device; and
   the device to:
     following a loss and a recovery of the standby power to the device, determine whether the backup power was lost during the loss of the standby power;
     based on a determination that the backup power was lost during the loss of the standby power, read the first configuration data;
     based on a determination that the backup power was not lost during the loss of the standby power, read the second configuration data; and
     apply the read one of the first configuration data or the second configuration data to configure the device.

2. The apparatus of claim 1, wherein the device is to determine whether the backup power was lost during the loss of the standby power based on whether a predefined bit corresponding to the backup power is set to a one or a zero.

3. The apparatus of claim 1, wherein the battery is to provide backup power to a set of registers in the device, each of the registers in the set of registers to program a value corresponding to the read one of the first configuration data or the second configuration data, wherein the value indicates a functionality of a hardware component associated with the register.

4. The apparatus of claim 1, wherein the first configuration data and the second configuration data are maintained as entries in a table.

5. The apparatus of claim 1, wherein to initialize the computing system, the power circuit is further to transmit main power to the device.

6. The apparatus of claim 5, wherein the power circuit is to receive alternating current (AC) power from an AC power source and to transmit one of the standby power and the main power from the AC power source.

7. A method comprising:
   determining, by a device, that receipt of a first power type by the device was initiated;
   determining, by the device, whether the device received backup power from a battery prior to initiation of the receipt of the first power type; and
   based on a determination that the device did not receive backup power from the battery prior to initiation of the receipt of the first power type,
     processing, by the device, first configuration data for the device; and
     applying, by the device, the processed first configuration data to configure the device.

8. The method of claim 7, further comprising:
based on a determination that the device received backup power from the battery prior to initiation of the receipt of the first power type,
processing second configuration data for the device; and
applying the second configuration data to configure the device.

9. The method of claim 8, wherein the first configuration data corresponds to an instance in which the device recovered from a state in which the device did not receive the first power type or backup power and the second configuration data corresponds to an instance in which the device received the backup power prior to initiation of the receipt of the first power type.

10. The method of claim 7, wherein processing the first configuration data further comprises:
obtaining a value corresponding to the first configuration data from a table; and
programming a register internal to the device with the value, wherein the value indicates a functionality of a hardware component associated with the register.

11. The method of claim 7, further comprising:
determining whether a predefined bit is set, the predefined bit corresponding to application of the backup power; and
wherein determining whether the device received backup power from a battery prior to initiation of the receipt of the first power type further comprises determining whether the device received backup power prior to initiation of the receipt of the first power type based on the determination as to whether the predefined bit is set.

12. The method of claim 7, wherein the battery is to provide backup power to a set of registers in the device, each of registers in the set of registers to program a value corresponding to the first configuration data, wherein the value indicates a functionality of a hardware component associated with the register, and wherein applying the processed first configuration data to configure the device further comprises applying the value to the hardware component.

13. A non-transitory computer readable medium on which is stored machine readable instructions that when executed by a processor, cause the processor to:
determine whether a backup power was applied to a device;
based on a determination that the backup power was not applied to the device, read the first configuration data;
based on a determination that the backup power was applied to the device, read the second configuration data; and
apply the read one of the first configuration data or the second configuration data to configure the device.

14. The non-transitory computer readable medium of claim 13, wherein a predefined bit is to be set to a zero value in an instance in which the backup power was not applied to the device, and wherein the instructions are further to cause the processor to:
determine whether the predefined bit has a zero value; and
based on the predefined bit having a zero value, determine that the backup power was not applied.

15. The non-transitory computer readable medium of claim 13, wherein the battery is to provide backup power to a set of registers in the device, each of registers in the set of registers to program a value corresponding to the first configuration data or the second configuration data, wherein the value indicates a functionality of a hardware component associated with the register, and wherein the instructions are further to cause the processor to apply the value to the hardware component.

* * * * *